United States Patent Office 2,842,826
Patented July 15, 1958

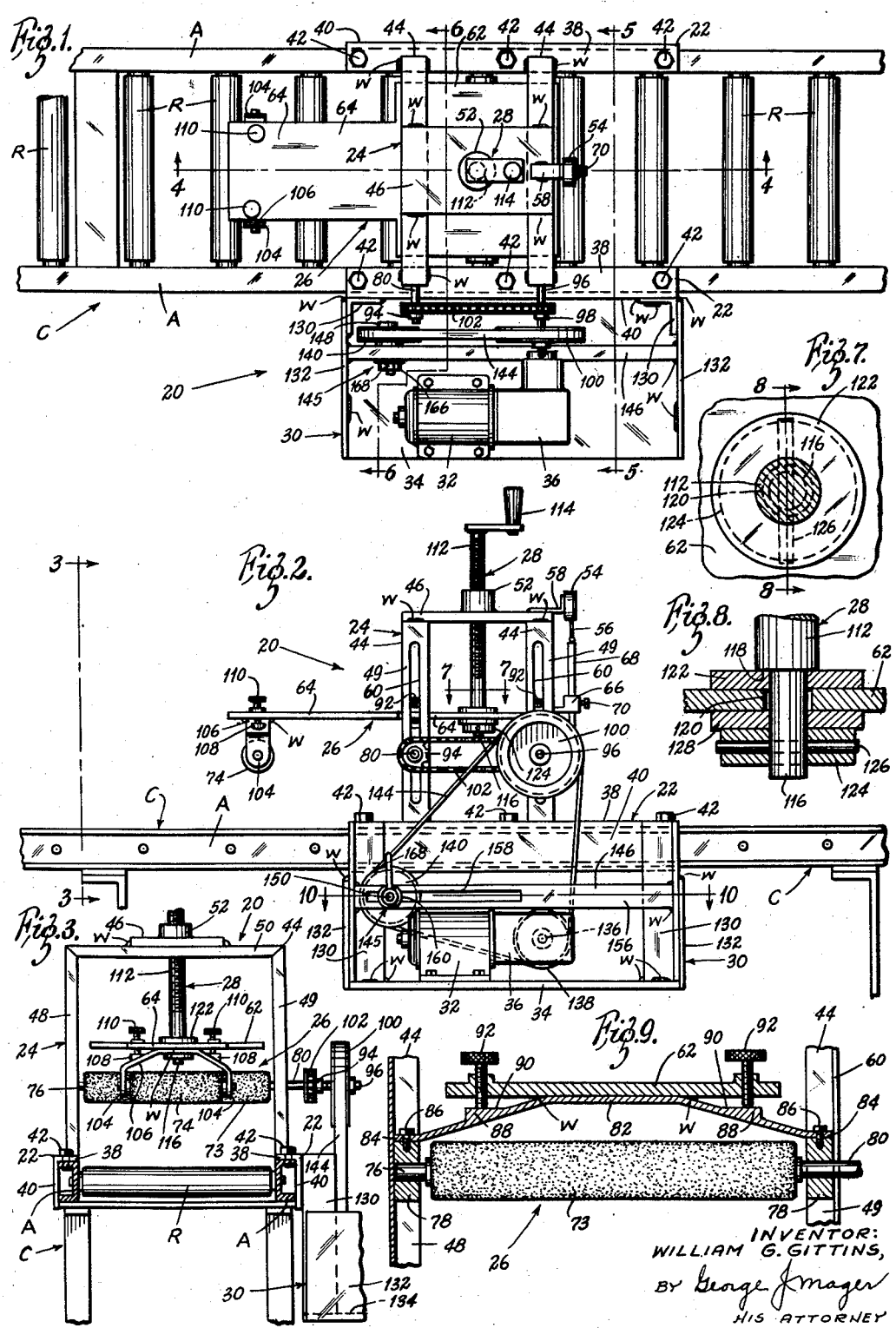

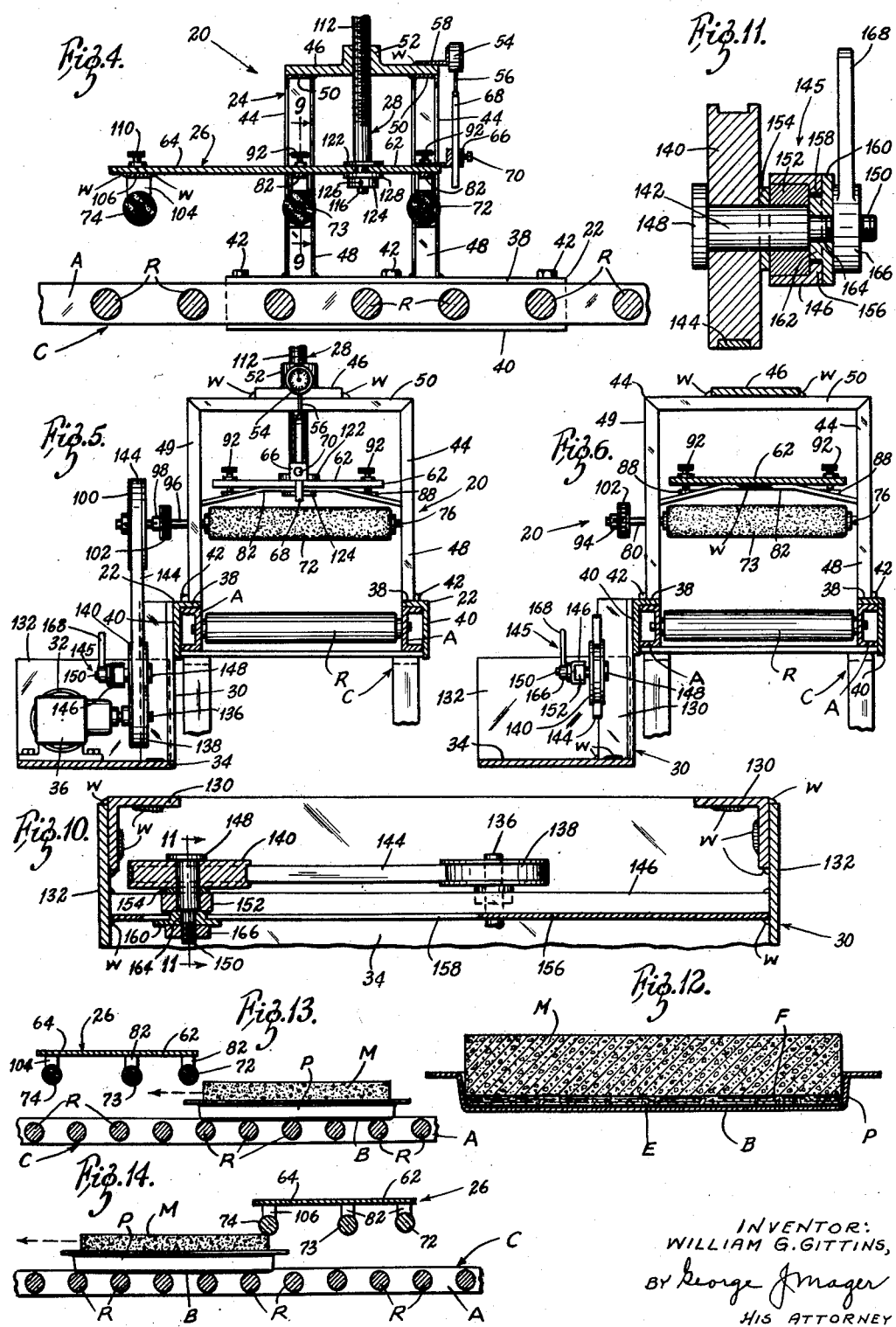

2,842,826

APPARATUS FOR USE IN MANUFACTURING PLASTIC FACED BUILDING UNITS

William G. Gittins, Ladue, Mo., assignor to Volz Concrete Materials Company, St. Louis, Mo., a corporation of Missouri Application May 15, 1957, Serial No. 659,316

7 Claims. (Cl. 25—1)

The present invention relates generally to the art of manufacturing blocks, panels, slabs and the like for use in building construction.

More particularly, this invention relates to an apparatus for use in the manufacture of prefabricated building units that are provided with a coating or facing of smooth plastic material bonded to a precast body of concrete or similar material.

In my copending application Serial No. 632,491, filed January 4, 1957, there is set forth in detail a process for producing plastic faced building units of the type under consideration.

The present invention is designed for use in practising the process set forth, by providing a novel apparatus adapted to achieve the results of one of the included steps of said process in a more positive and economical manner.

Briefly, the process referred to includes an intermediate step comprising the concurrent application of pressure thereto during the subjection of a mold pan and its contents to a succession of both vertical and horizontal vibrations, in order to effect positive cohesion between a layer of plastic material and one face of a precast building unit.

By the use of the present invention, positive cohesion is effected without the necessity of vibratory operations, and at the same time, a considerable saving in the quantity of plastic material required to face a building unit may be had.

Another advantage resultant from the use of the present invention resides in the production in large quantities of ultimate building units that are uniformly sized, as will appear.

In order to attain these advantages, the present invention provides an apparatus in the form of a unit that may readily be affixed to a conventional roller type conveyor. The apparatus includes a pressure equalizing assembly that may be finely adjusted so as to impart an exact predetermined pounds per square inch pressure to any number of mold pans and contents as they are successively subjected to the action of said apparatus. The pressure equalizing assembly includes a pair of spaced presser rollers preferably of hard rubber material, and a level roller of similar material, said rollers being dependingly and adjustably supported from a horizontally disposed plate. The plate is supported from the lower end portion of a relatively heavy screw that extends through and engages a threaded boss rigid with the superstructure of the apparatus. A handle is secured to the upper end of the screw, so that as will appear, rotations of said screw in a counterclockwise direction effect incremental elevations of said equalizing assembly, whereas rotations of said screw in a clockwise direction effect incremental lowerings thereof.

The presser rollers are rotatably supported in bearing blocks that are slidably mounted for vertical movements concurrently with the equalizing assembly whereof they are components. Means are provided whereby the application of pressure may be regulated, and whereby any deviations from the determined pressure are visibly indicated.

The apparatus includes a depending framework whereon a motorspeed reducer unit is rigidly mounted. A novel belt and pulley drive arrangement, readily adjustable to accommodate itself to various elevations of the pressure equalizing assembly, is energizable via the output shaft of the speed reducer for rotating the presser rolllers simultaneously, and in the same direction.

It is accordingly, the primary object of the present invention to provide an apparatus comprising a unitary assemblage of elements adapted for ready positioning on and securement to a conventional roller type conveyor, said apparatus including means for effecting positive cohesion between a layer of plastic and a prefabricated building unit superimposed thereon in a mold pan.

Another object of the invention is to provide an apparatus of the character set forth in the preceding paragraph adapted to effect a considerable saving in the quantity of plastic material required to face a building unit.

Further objects and features of the invention will be apparent or pointed out hereinafter, and the preferred embodiment thereof is illustrated on two sheets of drawings that accompany this specification.

A more comprehensive understanding of the invention and its operation may be had from the description to follow with reference to said drawings, wherein:

Figure 1 is a top plan view of an apparatus embodying the principles of the present invention, said apparatus being shown operatively mounted on and supported by a conventional roller type conveyor;

Figure 2 is a side elevational view thereof;

Figure 3 is a front elevational view thereof taken on the line 3—3 of Figure 2;

Figure 4 is a longitudinal vertical sectional view taken on the line 4—4 of Figure 1;

Figure 5 is a transverse vertical sectional view taken on the line 5—5 of Figure 1;

Figure 6 is a similar view taken on the line 6—6 of Figure 1;

Figure 7 is an enlarged fragmentary plan view; partly in section, taken on the line 7—7 of Figure 2;

Figure 8 is a vertical sectional view taken on the line 8—8 of Figure 7;

Figure 9 is an enlarged fragmentary vertical sectional view taken transversely of the apparatus on the line 9—9 of Figure 4;

Figure 10 is an enlarged fragmentary horizontal sectional view taken on the line 10—10 of Figure 2;

Figure 11 is a further enlarged fragmentary vertical sectional view taken on the line 11—11 of Figure 10;

Figure 12 is a longitudinal sectional view of an exemplary mold pan and an exemplary prefabricated concrete building unit superimposed therein onto a previously introduced layer of plastic material; and Figures 13 and 14 are diagrammatical views that illustrate the Figure 12 pan and its contents being subjected to the action of the apparatus comprising the present invention.

The apparatus embodying the concepts of the present invention comprises an integrated assemblage of structural members, and moving or movable elements associated therewith. That is to say, said apparatus would be designed as a unit for ready attachment, in operative status, onto a conventional roller type conveyor, the width of such conveyor determining the spacing of a pair of angular supports for the apparatus, as will be apparent.

In Figures 1 through 6, the apparatus comprising the present invention is designated generally by the numeral 20. Included in said apparatus are: a pair of transversely spaced angle supports each designated 22; a superstructure integrated with said supports generally designated 24; a pressure equalizing assembly 26; manually operable means generally designated 28 for suspending the assembly 26 on a selected horizontal plane within the superstructure 24; a framework 30 depending from and integrated with one of said angle supports 22; a motor 32 mounted on the base plate 34 of said framework; a speed reducer gear box 36 associated with said motor; and other stationary or movable elements, as will appear.

As indicated hereinbefore, the apparatus 20 is fabricated for ready mounting on a conventional roller type conveyor. Shown in the drawings is a portion of a typical conveyor designated C, said conveyor including transversely spaced rails A that rotatably support longitudinally spaced rollers R.

Each angle support 22 includes a horizontal leg segment 38 and a vertical leg segment 40. Bolts 42, extending through circular openings in the segments 38 and into engagement with threaded holes in the rails A, serve to rigidly attach the apparatus 20 to the conveyor C, as clearly demonstrated particularly in Figure 3.

The superstructure 24 comprises a pair of longitudinally spaced rectangular arch members 44 surmounted by a connecting plate 46. The arch members 44 are channel-shaped in cross section, and the lower ends of their perpendicular sections 48 and 49 are welded as suggested at w to the horizontal leg segments 38 of the support members 22. The plate 46 is welded to the top surfaces of the horizontal sections 50 of the arch members as also suggested at w particularly in Figure 1. (At this point it is noted that all of the structural members included in the apparatus 20 are preferably welded together, such welds being also indicated w in various views of the drawings irrespective of the particular members referred to in the description to follow hereinafter.)

Centrally thereof, the plate 46 is provided with an internally threaded boss portion 52, and a dial indicator 54 having a depending actuator stem 56 is mounted thereon by means of a bracket 58, as shown. An elongated slot 60 is formed in each of the perpendicular sections 49 of the arch members.

The pressure equalizing assembly 26 includes a substantially rectangular plate 62 having a forwardly projecting extension 64 integral therewith. As best seen in Figure 4, a bracket 66 is affixed to and projects beyond the rear marginal edge of the plate 62. A gauge bar 68 is slidably supported in said bracket, and as shown, is adapted to be maintained in a selected position by means of a set screw 70. The gauge bar 68 is disposed in vertical alignment with the dial indicator actuating stem 56 as most clearly also demonstrated in Figure 4.

A pair of longitudinally spaced transverse rubber rollers 72 and 73 are dependingly supported from the plate 62, and a third rubber roller 74 is similarly supported from the extension 64. All three rollers are correspondingly diametered and coplanarly disposed, as illustrated.

The supporting means for the intermediate roller 73 may be seen to best advantage in Figure 9, it being observed that the roller 72 is similarly mounted, with corresponding parts thereabout being indicated by the same reference numerals in the views of the drawings.

Projecting laterally from one end of the roller 73 is a pintle 76 rotatably supported in a bearing block 78 that is slidable in the channel-shaped arch section 48. Projecting laterally from the opposite end of the roller is a shaft 80, also rotatably supported in a bearing block 78 that is slidable in the channel-shaped arch section 49. Numeral 82 designates a transverse bar of spring metal material that is rigidly secured to the underside of the plate 62. The opposite extremities 84 of said bar are attached to the bearing blocks 78 preferably by cap screws 86 as shown, or otherwise.

The bar 82 incorporates a pair of transversely spaced abutment segments 88 provided with co-planar top surfaces 90. The lower extremities of the shank portions of the thumbscrews 92 carried by the plate 62 as shown, bear against said surfaces 90, whereby the disposition of roller 73 relatively to said plate may be regulated, and wear sustained by said roller may be compensated for.

The shaft 80 extends through and beyond the elongated slot 60, and has a sprocket 94 affixed to the end thereof. The corresponding shaft associated with the roller 72 is designated 96, and has a sprocket 98 and a driven pulley 100 affixed to the end thereof. Numeral 102 designates an endless chain trained over the sprockets 94 and 98, said sprockets being identical, wherefore rotary movements of them responsive to chain travel are uniform.

The roller 74 is an idler and will hereinafter be termed a level roller for reasons to appear. As seen to best advantage in Figures 2 and 3, this roller is journaled in the transversely spaced end portions 104 of a spring metal bar 106 that is rigidly secured to the underside of the plate extension 64. Similarly to the bars 82, the bar 106 incorporates a pair of spaced abutment segments 108 provided with co-planar top surfaces. The lower extremities of the shank portions of a pair of thumb-screws 110 carried by extension 64 as shown, bear against said surfaces of the abutment segments 108, whereby the disposition of the roller 74 may be regulated, and wear sustained by said roller may be compensated for as should be apparent.

The manually operable means 28 for suspending the assembly 26 comprises as its major component a relatively heavy threaded shaft 112 extending through and in engagement with the internally threaded boss portion 52 of the plate 46. An operating handle 114 is rigid with the upper end of said shaft. As shown on an enlarged scale in Figure 8, the lower end of the shaft 112 terminates in a depending extension 116 of reduced diameter, thus defining on said shaft an annular shoulder designated 118.

The shaft extension 116 projects freely through a circular opening 120 provided in the plate 62, with a relatively heavy and large diametered washer 122 being interposed thereabout between the shoulder 118 and the upper surface of said plate. A collar 124 is secured to the lower extremity of the extension 116 by means of press fitted pin 126, with a relatively heavy and large diametered washer 128 being interposed about the intermediate portion of said extension between the collar 124 and the undersurface of the plate 62, as shown.

The framework 30 is dependingly integrated with one of the angle supports 22, and preferably includes a pair of angular supports 130, a pair of reinforcement side plates 132, and the aforementioned base plate 34 whereon the motor-gear box unit is rigidly mounted.

The output shaft of the speed reducing gear box 36 is designated 136, and affixed thereto is a drive pulley designated 138. An idler pulley 140 is rotatably supported on a stud 142, and as clearly illustrated in the drawings, an endless belt 144 is trained over the drive pulley 138, the driven pulley 100, and said idler pulley 140.

With attention directed particularly to Figures 10 and 11, it is observed that the assembly 145 that supports the idler pulley 140 is slidably mounted in a track 146 of channel cross-sectional configuration. The stud 142, terminating at one end in an enlarged head 148 and at its opposite end in a threaded shank 150 of reduced diameter, is supported in a bearing block 152 slidable in the channel track 146. A washer 154 is interposed about the stud 142 between the idler pulley 140 and the adjacent face of the bearing block.

With reference also to Figure 2, the web portion 156 of the channel track has formed therein an elongated horizontal slot 158 of rectilinear configuration. Numeral 160 indicates a disc member having a square segment 162 integrally formed therewith, and a circular opening 164 extending therethrough. The segment 162 is adapted to ride in the elongated slot 158 aforesaid, with the threaded shank 150 extending through the opening 164 and projecting beyond the outer face of the disc member 160. Numeral 166 designates a lock nut in engagement with the threaded shank 150 and adapted to bear against the outer face of the disc member 160. To facilitate the adjustability of the described assembly of parts 145, the lock nut 166 is provided with an integral handle 168.

Prior to explaining the operation of the invention, a few general observations will be given. Thus for example, although not illustrated in the drawings, it is deemed understood that the motor 32 would be connected to a source of electrical energy via a chord terminating in a plug in the usual manner, and that a conventional start and stop switch would be provided. Further, the transverse spacing of the angle supports 22, and consequently that of the perpendicular sections 48 and 49 of the arch members 44, would be governed by the width of the conveyor A whereonto mounting of the apparatus 20 were contemplated.

It is also to be understood that if desirable, a chain and sprocket drive may be substituted for the belt and pulley drive means illustrated. Again, it is to be noted that the bearing blocks 78, which rotatably support the presser rollers 72 and 73, are of rectangular configuration, so that canting or tilting of the pressure equalizing assembly 26 would be obviated in the course of vertical movements thereof responsive to rotary motion imparted to the shaft 112 by manipulations of the handle 114.

With respect to the framework 30, it is also to be understood that the structural components thereof would preferably but not necessarily be integrated by the weldings w as suggested in the drawings. In other words, if more feasible for shipping purposes or for any other reason, said structural elements could be integrated for example by means of bolts to provide an analogous framework.

*Operation*

In Figure 12, there appears in longitudinal section an exemplary mold pan and contents prepared for subjection to the action of the present apparatus. The mold pan, designated P, is of stainless steel and has a thin coating or film or wax E applied to the upper surface of its bottom wall B. A layer of plastic material in liquid state, having a determined quantity of irregular fragments or chips of marble, quartz, or granite intermixed therewith, is designated F. A precast body M of concrete or similar material, dimensioned correspondingly with the mold cavity, is shown superimposed in the pan P onto the layer of plastic material F.

As indicated hereinbefore, the process set forth in my said co-pending application Serial No. 632,491, includes the step of applying pressure to such mold pan and contents concurrently with the subjection thereof to a succession of both vertical and horizontal vibrations in order to effectuate a positive cohesive condition between the plastic material F and one face of the precast building unit M.

In accordance with the concepts of the present invention, the application of pressure alone would effect the desired positive cohesive condition without requiring vibratory treatment, inasmuch as predetermined uniformly applied pressure to each square inch of the unit M has been found, by numerous tests, to dissipate any and all air globules in the plastic material.

Assuming that it were contemplated to process a large number of pans and contents typified by the Figure 12 portrayal, the apparatus 20 will have been conditioned and adjusted accordingly, resulting in the exemplary status of said apparatus illustrated in the drawings. In other words, the apparatus would have been placed in the operative status shown as will next be explained, it being understood that directional terms that are employed in said explanation have reference to the apparatus as viewed in the drawings.

In order to "set up" the apparatus 20, the handle 168 would be moved counterclockwise whereby to release the nut 166 from frictional engagement with the disc member 160. In consequence of this operation, the entire assembly 145 supporting the idler pulley 140 would be free to slide rightwardly in the track 146, thus providing slack in the drive belt 144. Thereupon, after lowering the gauge bar 68, the threaded shaft 112 would be rotated counterclockwise by means of the handle 114 to elevate the assembly 26, the slack in said belt facilitating upward movement of the driven pulley 100, while the slots 60 of the perpendicular segments 49 accommodate upward movement of the shafts 80 and 96 which project therethrough.

Next, a trial pan and contents, similar to that illustrated in Figure 12, would be placed on the conveyor directly below the co-planar rollers 72, 73, and 74, whereupon the shaft 112 would be rotated clockwise to lower the assembly 26 until the rollers aforesaid contacted the upper surface of the precast body M. At this point, it would be visually determinable whether the presser rollers 72 and 73 as well as the level roller 74 were identically disposed, and if not, their disposition could readily be adjusted to uniformity by manipulation of the thumbscrews 92 and 110, as is understood.

(At this point it is noted that in consequence of numerous tests, it has been found that an applied pressure ranging from a minimum of 60 p. s. i. to a maximum of 100 p. s. i. may be requisite, predicated on the plastic mixture density and the material whereof the building unit to be faced is composed.)

Thus, it having been determined for example that the pressure to be applied by the rollers 72 and 73 should be seventy pounds per square inch with respect to the typical mold pan and contents of Figure 12, the gauge bar 68 would now be raised against the actuator stem 56 until the dial indicator 54 exhibited a corresponding reading, whereupon the set screw 70 would be tightened. With the trial pan and contents now removed, the shaft 112 would again be rotated clockwise until the dial indicator registered a zero pounds pressure reading. The final step in the procedure would consist of sliding the assembly 145 leftwardly along the track 146 until the belt 144 became taut, whereupon the handle 168 would be rotated clockwise until the nut 166 impinged against the disc member 160 whereby to lock the pulley 140 against lateral movements.

The apparatus 20 having thus been conditioned, the motor 32 would be energized to drive the rollers 72 and 73 continuously in a clockwise direction. Thereafter, as suggested diagrammatically in Figures 13 and 14, any number of the Figure 12 pans and contents could be manually fed into the apparatus in succession, and propelled therethrough automatically by the rotation of the rollers 72 and 73 concurrently with the application by said rollers of the prescribed pressure.

It is noted that the level roller 74 plays an important role in such operations, in that it prevents upward tilting of the leading portion of the pan assembly after it has passed leftwardly beyond the roller 73. The gauge bar 68 and dial indicator 54 combination also plays an important role, in that an attendant feeding pan assemblies into the apparatus, can readily detect any variations in pressure application by observance thereof, as should be evident. Minute adjustments may be made by manipulations of the thumbscrews 92 and 110, and the handle 114. It is also noted that from time to time, wear sustained by the rubber presser and level rollers may be compensated for by manipulations of said thumbscrews 92 and 110. Further as should be evident, the assembly 145 may be employed at any time to take up any slack that may develop in the belt 144 in consequence of continued operations.

Assuming now for example, that the facing of precast building units M of greater height (as viewed in Figure 12) were contemplated, the apparatus 20 would be "set up" for such operations in precisely the same manner as described above.

In view of the foregoing description augmented by the drawings, it is believed that an adequate disclosure of the present invention has been given. It is also believed manifest that the invention provides novel means for the attainment of its objectives.

Although the preferred embodiment of my invention has been illustrated and described, it is to be understood that the invention is not limited to the precise details of construction disclosed, but contemplates any and all modifications and equivalents that may fall within the purview of the claims hereunto appended.

What I claim is:

1. Apparatus for use in manufacturing plastic faced building units comprising in combination: spaced angle supports for mounting the apparatus on the side rails of a roller type conveyor; a superstructure integrated with said supports comprising a pair of longitudinally spaced channel-shaped arch members connected at the top by a horizontally disposed plate member; a pressure indicating dial having depending actuator stem mounted on said plate member; a pressure equalizing assembly suspended from and slidably disposed within the superstructure, said assembly including a pair of longitudinally spaced transversely disposed presser rollers and an idler roller; manually operable means for maintaining the presser and idler rollers in co-planar disposition; manually operable means for varying the distance between said rollers and the conveyor; a substructure integrated with one of the angle supports and depending therefrom along one side rail of the conveyor; a combined motor and speed reducer unit mounted on the base plate of the substructure; means for simultaneously driving said presser rollers in the same direction and at the same speed from the output shaft of said unit; and a vertically adjustable gauge bar carried by said pressure equalizing assembly for engaging the depending actuator stem of the pressure indicating dial aforesaid.

2. Apparatus for use in manufacturing plastic faced building units comprising in combination: spaced angle supports for mounting the aparatus on the side rails of a roller type conveyor; a superstructure integrated with said supports comprising a pair of longitudinally spaced channel-shaped arch members connected at the top by a horizontally disposed plate member; a pressure indicating dial having a depending actuator stem mounted on said plate member; a pressure equalizing assembly suspended from and slidably disposed within the superstructure, said assembly including a pair of longitudinally spaced transversely disposed presser rollers and an idler roller; manually operable means for maintaining the presser and idler rollers in co-planar disposition; a substructure integrated with one of the angle supports and depending therefrom along one side rail of the conveyor; a combined motor and speed reducer unit mounted on the base plate of the substructure; means for simultaneously driving said presser rollers in the same direction and at the same speed from the output shaft of said unit; means for varying the disposition of the pressure equalizing assembly; means for changing the disposition of said driving means; and a vertically adjustable gauge bar carried by said pressure equalizing assembly for engaging the depending actuator stem of the pressure indicating dial aforesaid.

3. Apparatus for use in manufacturing plastic faced building units comprising in combination the structure set forth in claim 2, wherein the means for changing the disposition of the driving means comprises: an assembly including an idler pulley rotatably mounted on a stud terminating at one end in an enlarged head and at its opposite end in a threaded shank of reduced diameter; a bearing block for the stud slidably mounted in a horizontally disposed track, said track having an elongated horizontal slot of rectilinear configuration through which said shank portion projects formed in the web portion thereof; a washer interposed about the stud between said pulley and the adjacent face of the bearing block; a nut in engagement with the end portion of the threaded shank; a centrally apertured disc member interposed about said shank between said web portion of the track and said nut, said disc member having an integral square segment adapted to ride in the slot aforesaid; and a handle rigid with said nut for facilitating rotation thereof whereby to releasably clamp said disc member and bearing plate in a selected position longitudinally of said slot.

4. An apparatus for applying a determined pounds per square inch pressure to a mold pan and contents of the character described, said apparatus comprising in combination with a roller type conveyor whereon said mold pan and contents are disposed: a pair of transversely spaced angle supports adapted to be secured to the side rails of said conveyor; a pair of longitudinally spaced arch members of channel-shaped cross-sectional configuration each including transversely spaced perpendicular sections connected at the top by a horizontal section, the lower ends of said perpendicular sections being welded to said angle supports; a plate having an internally threaded boss centrally thereof rigid with and connecting the horizontal sections of the arch members; a vertically disposed threaded shaft in engagement with said boss and extending thereabove and therebelow; a handle affixed to the upper end thereof for rotating said shaft; a pressure indicating dial supported from a bracket rigidly attached to said plate, said dial having a depending actuator stem; a pressure applying and equalizing assembly suspended from the lower end of said shaft, said assembly including a horizontally disposed plate, a pair of longitudinally spaced presser rollers and a level roller, all of said rollers being co-planarly disposed, correspondingly diametered, and dependingly supported from said horizontally disposed plate; bearing blocks for the projecting shafts, of said presser rollers, said blocks being slidably disposed in the perpendicular sections of said arch members; a motor-speed reducer unit and driving connections for rotating said presser rollers concurrently in the same direction; a vertically disposed gauge bar slidably supported in a bracket affixed to said horizontally disposed plate, said bar being in alignment with the depending actuator stem of the dial indicator aforesaid; and a set screw to lock the gauge bar with its upper end in contact with the lower end of said actuator stem.

5. An apparatus for applying a determined pounds per square inch pressure to a mold pan and contents of the character described, said apparatus comprising in combination with a roller type conveyor whereon said mold pan and contents are disposed: the structure set forth in claim 4 wherein the recited horizontally disposed plate included in the pressure applying and equalizing assembly is of substantially rectangular configuration, and is suspended from the lower end of the rotatable threaded shaft by means of a collar rigidly secured to the lower extremity of a depending extension of said shaft, said extension being of reduced diameter and projecting freely through a circular opening in said plate, with a first relatively heavy large diametered washer interposed therebout between the resultant shoulder of said shaft and the upper surface of said plate, and a second similar washer interposed about said extension between said collar and the lower surface of said plate.

6. An apparatus for applying a determined pounds per square inch pressure to a mold pan and contents of the character described, said apparatus comprising in combination with a roller type conveyor whereon said mold pan and contents are disposed: the structure set forth in claim 4 wherein one of the perpendicular sections of each arch member is provided with an elongated vertical slot through which the corresponding shafts of the presser rollers extend and project; wherein both of said shafts have a chain driven sprocket affixed thereto; and wherein one of said shafts also has a driven pulley affixed thereto.

7. An apparatus for applying a determined pounds per square inch pressure to a mold pan and contents of the character described, said apparatus comprising in combination with a roller type conveyor whereon said mold pan and contents are disposed: the structure set forth in claim 4 wherein the coplanarly disposed presser and level rollers are formed of hard rubber or similar material, and wherein the disposition of each of them is governed by means of a pair of transversely spaced manually rotatable thumbscrews having their threaded shank portions extending through the recited horizontally disposed plate of the pressure applying and equalizing assembly, the lower extremities of said shank portions each bearing against the flat upper surface of one of a pair of transversely spaced abutment segments integral with a bar of spring material rigidly secured to the underside of said horizontally disposed plate, the extremities of each bar associated with the presser rollers being secured to the bearing blocks for the projecting shafts and pintles of said rollers, the extremities of the bar associated with the level roller rotatably supporting the projecting pintles thereof.

References Cited in the file of this patent

UNITED STATES PATENTS

| | | |
|---|---|---|
| 941,792 | Meeker | Nov. 30, 1909 |
| 1,570,594 | Stevens | Jan. 19, 1926 |
| 2,588,595 | Warner | Mar. 11, 1952 |